INVENTOR
Hirao Kobayashi
BY Marn & Jangarathis
ATTORNEYS

INVENTOR
Hirao Kobayashi

BY Marn & Jangarathis
ATTORNEYS

July 7, 1970 HIRAO KOBAYASHI 3,519,991

OPTICAL CHARACTER READING APPARATUS

Filed Feb. 2, 1968 6 Sheets-Sheet 3

INVENTOR
Hirao Kobayashi
BY Mann & Jangarathis
ATTORNEYS

| Numerals | UV 1 | UV 2 | UV 3 | UV 4 | UV 5 | LV 1 | LV 2 | LV 3 | LV 4 | LV 5 | LH U | LH M | LH L | SH U | SH M | SH L |
|---|---|---|---|---|---|---|---|---|---|---|---|---|---|---|---|---|
| 1 | 1 | 0 | 1 | 0 | 0 | 0 | 0 | 1 | 0 | 0 | 0 | 0 | 0 | 1 | 1 | 1 |
| 2 | 1 | 0 | 0 | 0 | 0 | 0 | 0 | 0 | 0 | 1 | 1 | 1 | 1 | 0 | 0 | 0 |
| 3 | 1 | 0 | 0 | 0 | 0 | 1 | 0 | 0 | 0 | 0 | 1 | 0 | 1 | 0 | 1 | 0 |
| 4 | 1 | 0 | 0 | 1 | 0 | 1 | 0 | 0 | 0 | 0 | 0 | 1 | 0 | 0 | 0 | 0 |
| 5 | 1 | 0 | 0 | 0 | 1 | 1 | 0 | 0 | 0 | 0 | 1 | 1 | 1 | 0 | 0 | 0 |

INVENTOR
Hirao Kobayashi
BY Mann & Jangarathis
ATTORNEYS

INVENTOR
Hirao Kobayashi
BY Mann & Jangarathis
ATTORNEYS

July 7, 1970 HIRAO KOBAYASHI 3,519,991

OPTICAL CHARACTER READING APPARATUS

Filed Feb. 2, 1968 6 Sheets-Sheet 6

INVENTOR
Hirao Kobayashi
BY Marn & Jangarathis
ATTORNEYS

United States Patent Office 3,519,991
Patented July 7, 1970

3,519,991

OPTICAL CHARACTER READING APPARATUS

Hirao Kobayashi, Tokyo, Japan, assignor to Nippon Electric Company, Limited, Tokyo, Japan Filed Feb. 2, 1968, Ser. No. 702,585
Claims priority, application Japan, Feb. 9, 1967, 42/8,500
Int. Cl. G06k *9/10*
U.S. Cl. 340—146.3 14 Claims

ABSTRACT OF THE DISCLOSURE

Optical apparatus for reading intelligence characters included in a document, comprising means moving the document at a constant speed in one direction, scanning each of the characters in turn via a plurality of solar battery cells disposed to extend beyond the length of the longest character in a direction transverse to the document moving direction for providing electric signals indicating dark sections of the scanned characters, first logic means translating the electric signals into first logic 1 and 0 signals, second logic means shifting successive groups of the latter logic 1-signals into two shift registers one group at a time, third logic means utilizing the successive groups of the logic signals in the upper and lower halves of the latter two registers to provide logic 1 and 0 signals to represent the upper and lower vertical lengths of each of the scanned characters in turn, and fourth logic means simultaneously utilizing three groups of different 1-signals of the successive groups of logic 1-signals shifted into one of the two registers to provide simultaneously three groups of logic 1 and 0 signals to represent either short or long widths at each of three different longitudinal sections of each of the scanned characters and a recognition circuit utilizing the logic 1 and 0 signals to re-establish each of the characters in turn as scanned. This apparatus employs a minimum number of shift registers and OR gates to correct deformed signal waveforms due to a vibrating belt carrying the document.

This invention relates to automatic optical apparatus for initially converting successive printed intelligence characters into the form of electric signals and, more specifically, to an improved arrangement including logic circuits for use in such apparatus to translate the electric signals into logic 1 and 0 signals in such manner as to obviate partially detected characters due to a vibrating belt carrying the characters for re-establishing the characters in recognition equipment.

Apparatus for optically reading successive intelligence characters printed on a document is heretofore known to the prior art. In this apparatus, the document is positioned on a belt moving past suitable scanning equipment for converting the characters into signals that may be expeditiously employed in recognition equipment to re-establish the characters. It has been found in such prior art apparatus that the document often moves in a direction perpendicular to the direction of movement of the belt owing to the vibration thereof. This often results in the partial readings of the characters on the occasions of the occurrences of the belt vibrations, and the consequent errors in computations utilizing such partially read characters. Also, prior art apparatus often includes such number of shift registers for storing bit information pertaining to whole characters at a given time thereby tending to involve numerous and expensive components.

The present invention contemplates an improved arrangement to compensate for the intermittent occurrences of vibration in a belt carrying a document having printed intelligence characters for reading in an automatic intelligence character reading apparatus.

A principal object of the present invention is to provide an improved apparatus for optically reading intelligence characters in printed form.

Another object is to obviate the occurrences of partially read intelligence characters in automatic optical character reading apparatus.

A further object is to compensate for the effects due to belt vibration and thereby to character displacement in automatic optical apparatus for reading intelligence characters.

Still another object is to ensure the reading of complete characters in automatic optical reading apparatus.

An additional object is to provide a facile apparatus for optically reading intelligence characters in their entirety in an expeditious manner in an intelligence character reading apparatus.

Still an additional object is to provide optical apparatus with a minimum number of components for reading intelligence characters in their entirety in an intelligence character reading apparatus.

Another object is to correct the positions of signals representing intelligence characters that are optically read during periods of the undesired displacement thereof in intelligence character reading apparatus.

A still further object is to simplify the operation of an optical intelligence character reading apparatus.

A further object is to provide an optical character reading apparatus having a reduced number of components for storing signals pertaining to whole characters.

A still further object is to reduce the cost of maintenance of optical intelligence character reading apparatus.

Another object is to reduce the cost of manufacture of optical intelligence character reading apparatus.

A specific embodiment of the present invention comprises a document containing a plurality of intelligence characters and disposed on an endless belt movable in a straight line in a first predetermined direction in a first plane at a constant speed, each character structured by vertical and horizontal strokes and formed in a dark section surrounded by a white section and effectively divided into a plurality of adjacent columns of meshes, each column containing 16 meshes and constituting a vertical stroke, each character having a predetermined number of vertical strokes as pointed out hereinafter, a plurality of solar battery cells arranged in spaced relation in a straight line over a distance extending beyond the longest of the characters and disposed to project in a direction transverse to the predetermined document moving direction in a second plane spaced from the first plane in parallel relation therewith, each of 16 of the solar cells disposed opposite one mesh in each of the 16 mesh vertical strokes and others of the solar cells disposed on opposite sides of the last-mentioned 16 solar cells; a source of light illuminating an area enveloping each of said characters in turn; lens means focusing light reflected from each of the characters in turn onto the solar cells which are activated by such reflected light to detect a predetermined number of electric signals due to contrasting white and dark meshes during each of the vertical strokes as each of the characters in turn is moved past the solar cells and lens means for reading at a given time; each of the 16 solar cells disposed opposite the character meshes detecting an electric signal for one of the dark meshes in each vertical mesh stroke as the belt is moved without vibration in each latter stroke and one or more of the 16 solar cells failing to detect an electric signal while one or more of the other solar cells disposed in front of one or more dark meshes beyond one end of the 16 solar cells detects an electric signal as the belt is moved with vibration to project in a direction transverse to the straight line movement thereof to displace one or more of the meshes of the vertical mesh stroke in front of the last-mentioned one or more solar cells.

A first plurality of signal amplifiers for amplifying electric signals is connected to the plurality of solar cells, each amplifier connected to one solar cell; a first counting means providing repetitive cycles of first counting pulses, each cycle containing a number of counting pulses equal to the number of solar cells in the plurality thereof; and a first logic means activated by the first counting pulses to scan each of the amplifiers in turn for deriving a 1-signal from the electric signal of each of the 16 solar cells disposed opposite one of the 16 dark meshes in each of the vertical mesh strokes as the belt is moved without vibration and for deriving a 1-signal from each of the amplifiers and thereby from each of the one or more other cells disposed in front of one or more dark meshes beyond one end of the 16 solar cells as the belt is moved with vibration to displace one or more of the meshes of the vertical mesh stroke in front of the last-mentioned one or more other solar cells. As the intelligence character being scanned is effectively divided into 16 meshes in each vertical stroke, 16 of the amplifiers and thereby 16 of the amplifier solar cells scan only 16 meshes in each vertical mesh stroke at a given time. When the belt is moved without vibration, the same 16 solar cells scan the same 16 meshes in each vertical mesh stroke at a given time. When the belt is moved without vibration, the same 16 solar cells scan the same 16 meshes in each vertical mesh stroke. As the belt is subjected to vibration from time to time and is thereby moved in a direction transverse to the straight line movement thereof to displace a portion of the character in the same transverse direction, one or more of the 16 solar cells may not scan one or more of the meshes in the vertical mesh stroke being scanned at the moment. However, at this time, other solar cells disposed in front of one or more dark meshes of the vertical stroke beyond a given end of the 16 solar cells, depending on a particular transverse direction, i.e., left or right or up or down, of the belt vibration at a give ntime, detects electric signals in response to such last-mentioned one or more dark meshes. Thus, 16 solar cells scan the 16 meshes of each vertical stroke, but the 16 solar cells effective at a given time may not necessarily comprirse the same 16 solar cells due to vibrationless or vibrating periods of the document moving belt as just mentioned.

As only 16 solar cells may scan 16 meshes of each vertical mesh stroke at a given time, this means that only 16 amplifiers are effective to pick up the 16 electric signals from the 16 solar cells at that time in either a normal or a deformed signal waveform. The first logic AND-OR means derives the amplified signals in succession from the amplifiers to provide logic 1-signals in a sequence which is the same for both normal and deformed signal waveforms. Thus, the deformed waveform is corrected in such sense that the 16 amplified signals derived from the 16 meshes in each vertical mesh stroke appear always to be derived from intelligence characters carried on a vibrationless belt.

A first shift register having three component registers and activated by the first counting pulses shifts thereinto the logic 1-signal, one at a time, from the respective outputs of the first logic AND-OR means and thereby serves to correct the positions of the latter signals. A second logic means activated by the first counting pulses and second counting pulses as controlled by the first counting pulses shifts the logic 1-signals from the first shift register into second and third shift registers, each having 16 component registers, connected in tandem for the succesively scanned vertical strokes. This occurs in such sense that the logic 1-signals derived from the scanned discrete meshes of vertical mesh strokes 1 and 2, for example, are via the first shift register shifted into the third and second shift, respectively, and the logic-1 signals derived from the scanned discrete meshes of vertical mesh strokes 3 and 4 are also shifted into the same third and second shift registers, respectively, until the logic 1-signals due to all scanned verticial mesh strokes are shifted into the second and third shift registers. It is thus seen that all first logic 1-signals may be stored in the second and third shift registers regardless of the positions of the meshes in vertical mesh strokes 1 and 2 due to a vibrating belt as well as a vibrationless belt.

A third logic means activated by preselected second counting pulses and utilizing the first logic 1-signals shifted into the 8 component registers in the upper halves of the second and third shift registers provides a first group of logic 1 and 0 signals to represent the lengths of the upper halves of each of the last-mentioned characters; a fourth logic means activated by the preselected second counting pulses and utilizing the first logic 1-signals shifted into the 8 component registers in the lower halves of the second and third shift registers provides a second group of logic 1 and 0 signals to represent the length of the lower halves of each of the last-mentioned characters; a fifth logic means activated by the preselected second counting pulses and three groups of the different logic 1-signals stored in the second shift register only provides three groups of other logic 1 and 0 signals to represent the length of three horizontal strokes located at three different horizontal sections of each of the intelligence characters in such sense that the respective horizontal strokes are short or long or a combination of both; and a recognition circuit for re-establishing each of the intelligence characters as scanned.

A feature of the invention resides in the obviation of partly scanned intelligence characters by the use of a plurality of solar battery cells exceeding a predetermined number of meshes into which each of a plurality of vertical mesh strokes is divided, each of a predetermined number of solar cells disposed opposite to one of the meshes of each vertical mesh stroke. Normally, the same solar cells scan the same meshes in each of the vertical mesh strokes so long as the belt carrying the intelligence characters for scanning is vibrationless. When, however, the belt is subject to the intermittent occurrences of vibration, one or more other solar cells disposed opposite to the displaced one end of the intelligence character is substituted for the corresponding one or more of the solar cells rendered ineffective at the opposite end of the displaced character. This ensures that an entire intelligence character is scanned at all times. Another feature concerns the use of discrete amplifiers connected to corresponding discrete solar battery cells and AND-OR logic means to correct deformed waveforms derived by the latter cells during the periods when the belt is subject to vibration. Still another feature involves the use of two of two shift registers having a predetermined number of component registers for storing the logic 1-signals for only whole characters.

The invention is readily understood from the following description taken together with the accompanying drawing in which.

Figure 1:
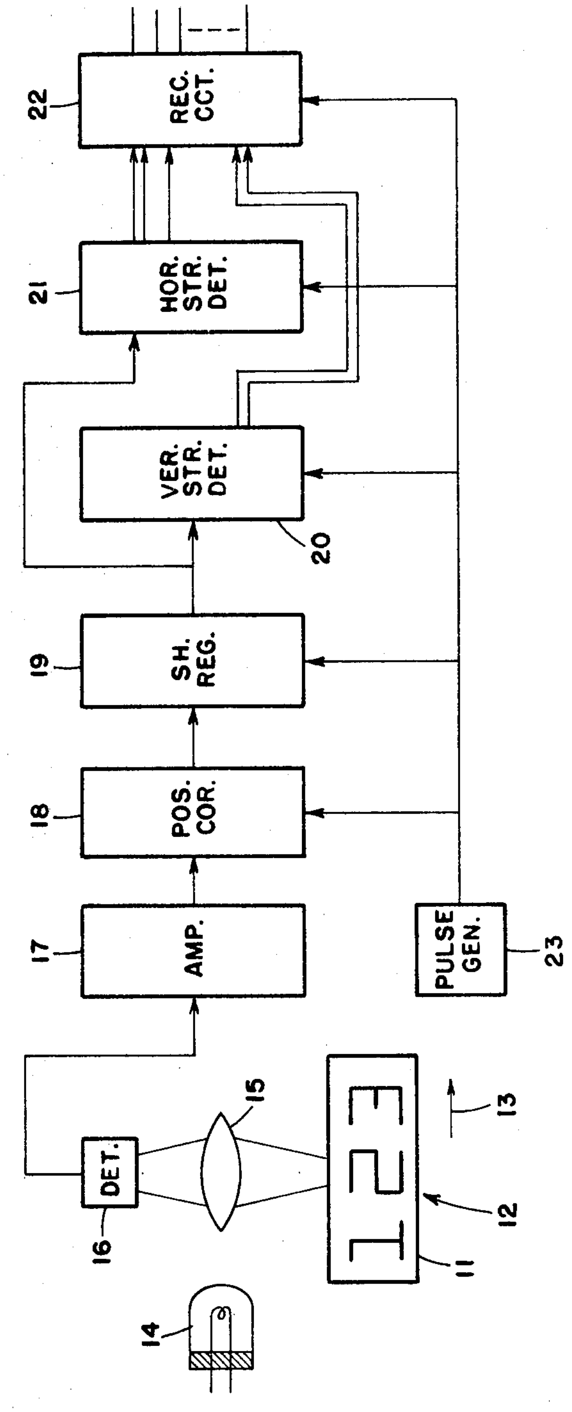
FIG. 1 is a block diagram including a specific embodiment of the invention.
Figure 2:
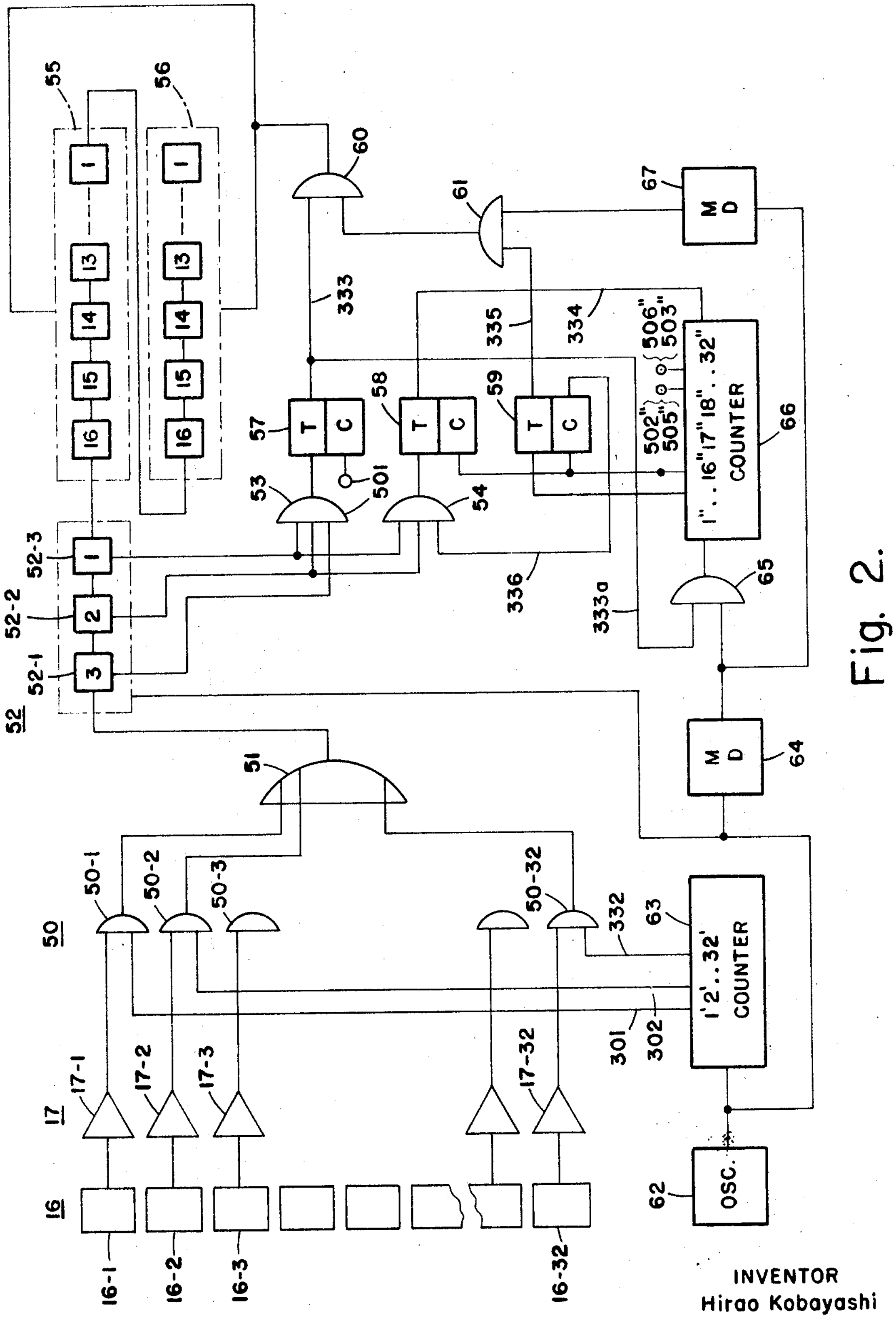
FIG. 2 is a box diagram showing a light detector, an amplifier and position correctors used in FIG. 1.
Figure 4:
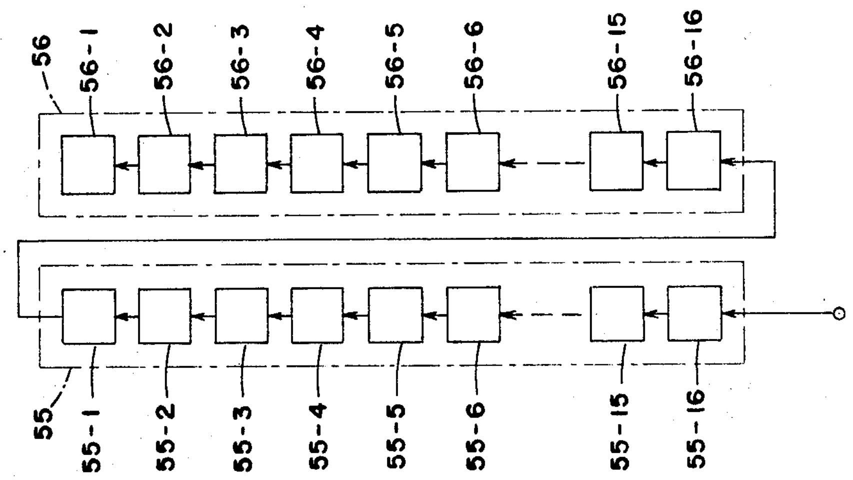
Figure 3B:
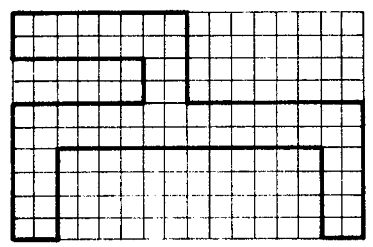
Figure 3A:
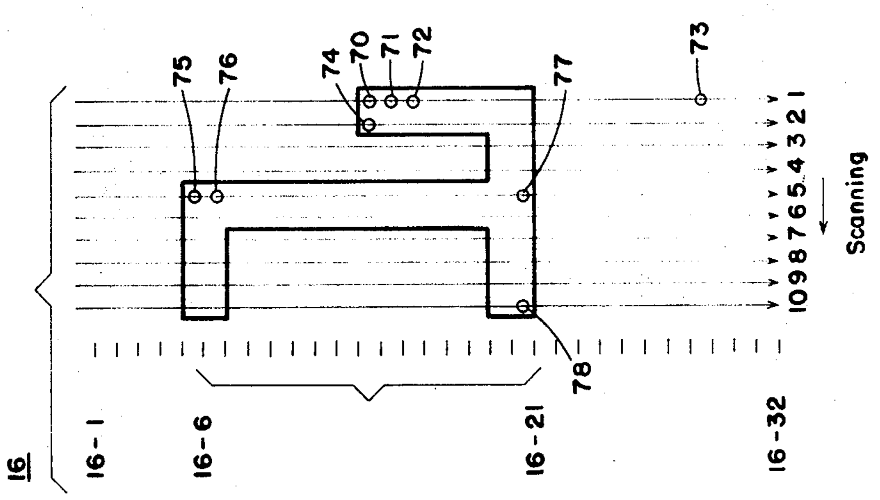
Figures 5A, 5B, 5C:
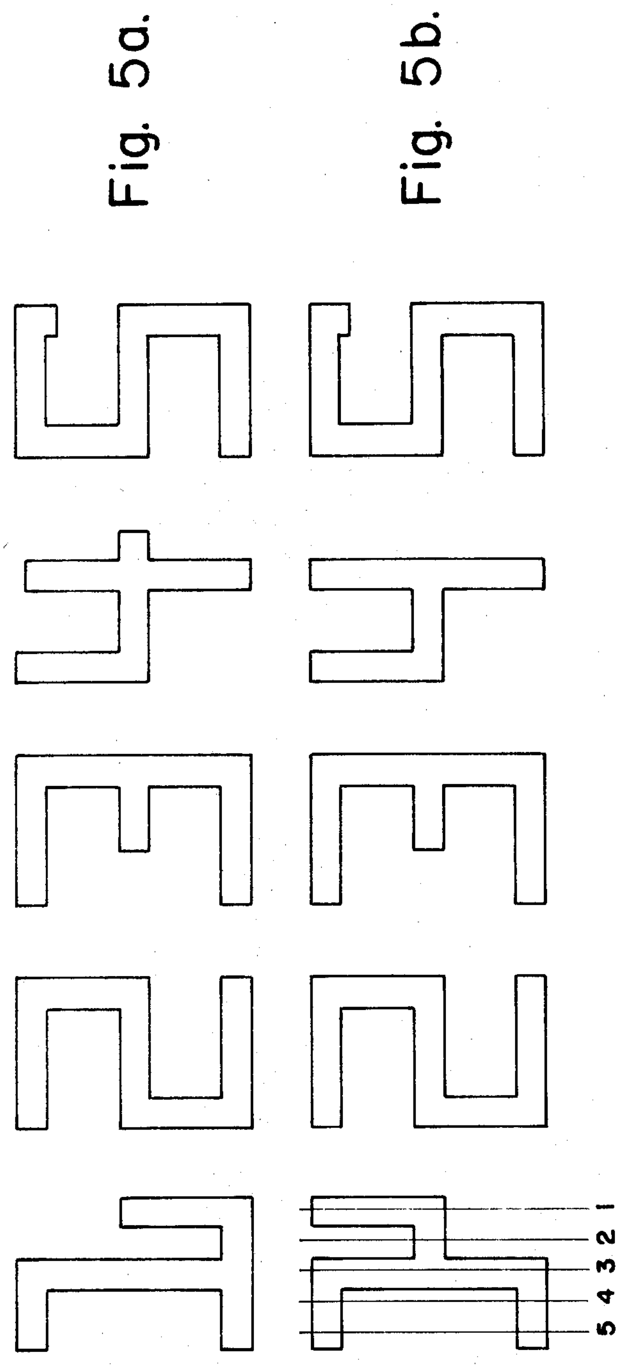
Figure 6:
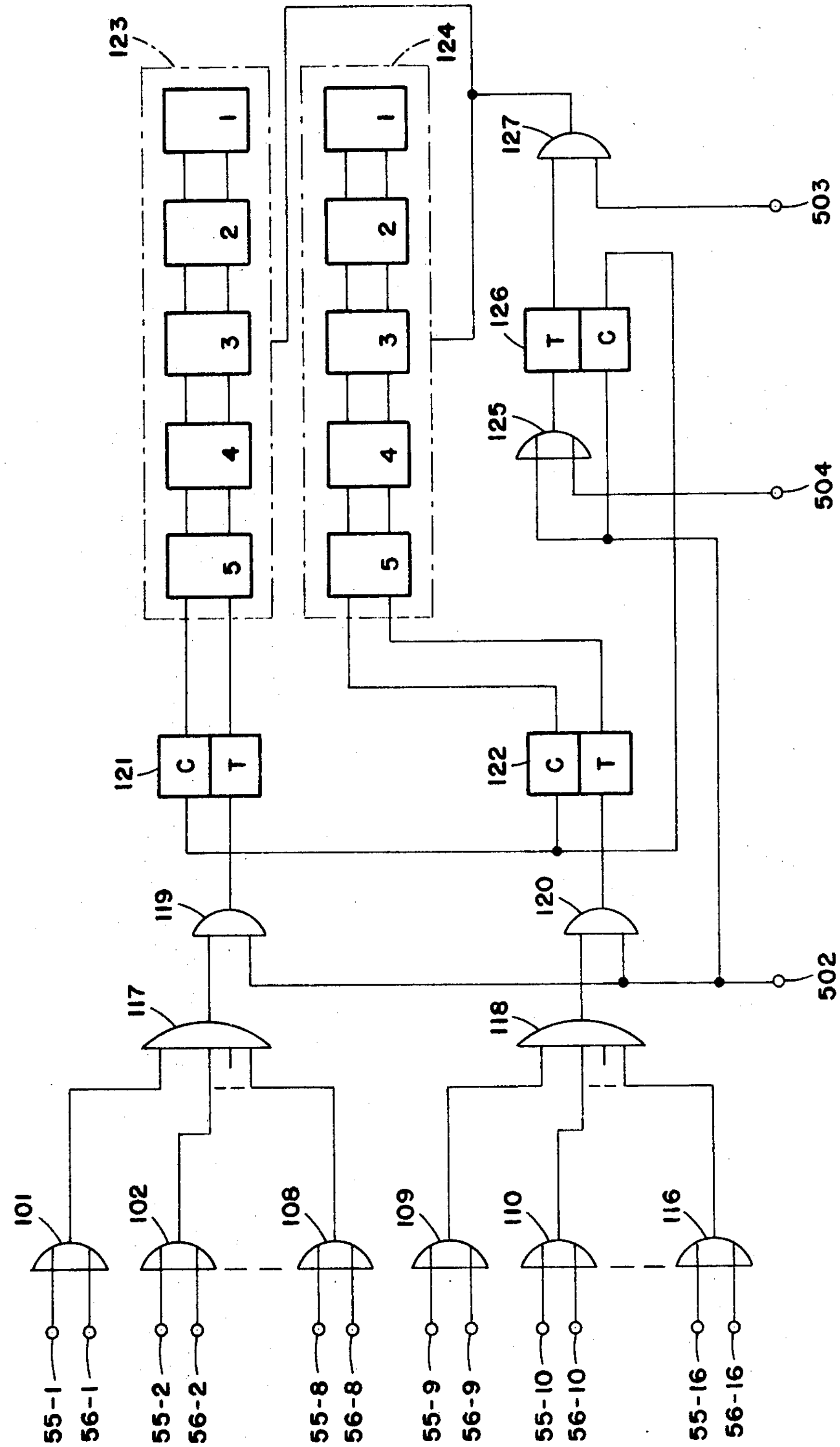
Figure 7C:
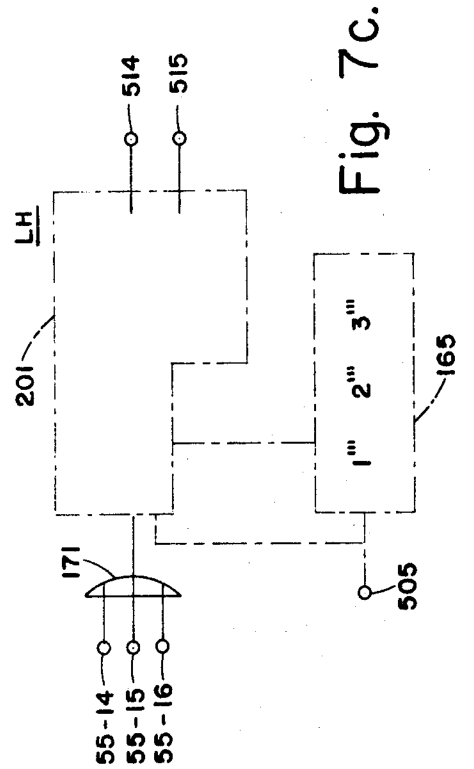
Figure 7B:
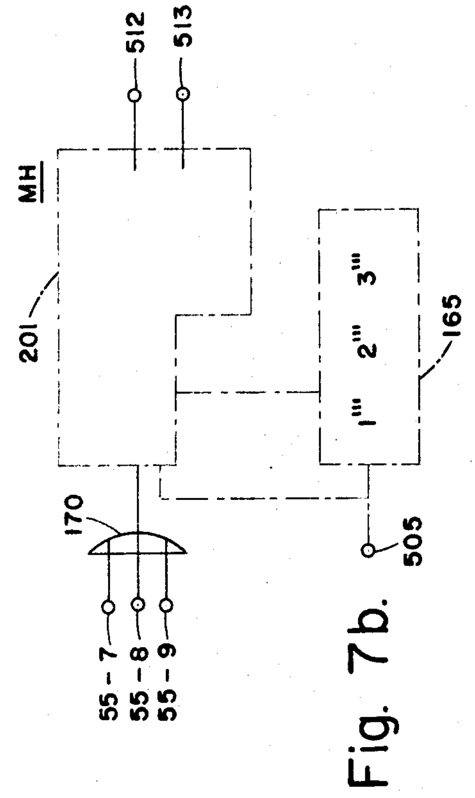
Figure 7A:
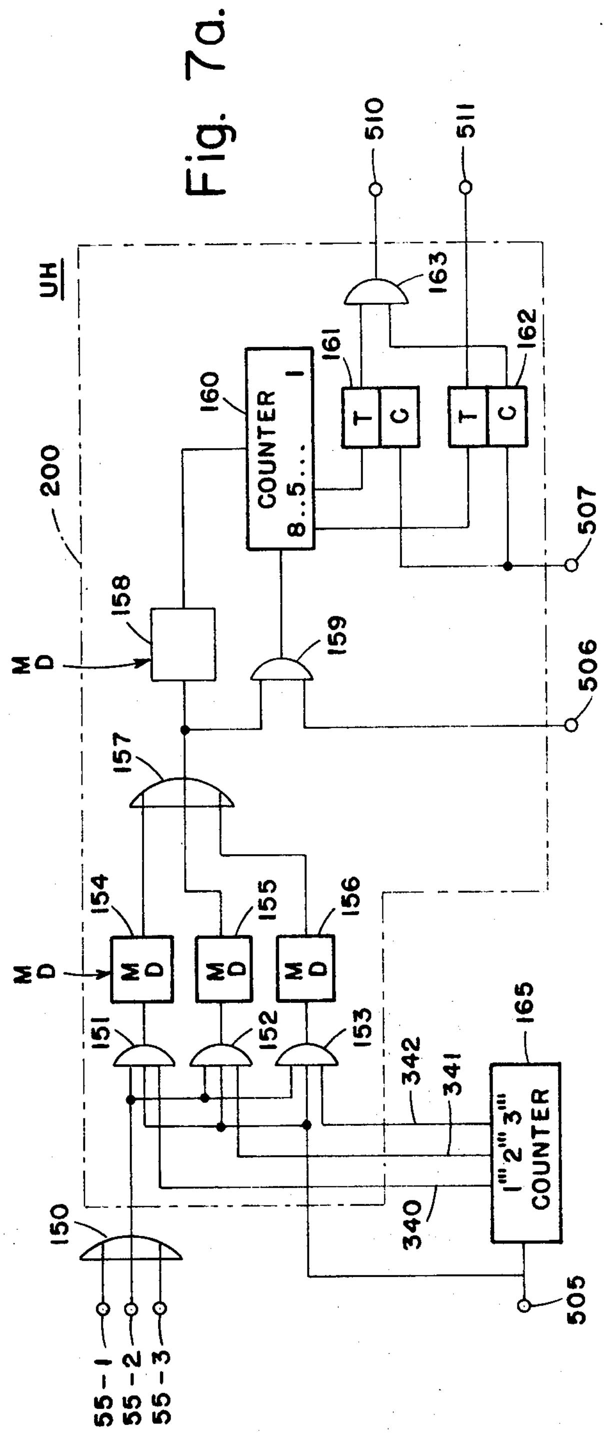

FIGS. 3*a* and *b* represent an intelligence character readable in FIGS. 1 and 2;

FIG. 4 is a box diagram illustrating the electrical connection of two identical shift registers used in FIG. 2;

FIGS. 5*a* and *b* illustrate specific forms of intelligence characters readable in FIGS. 1 and 2;

FIG. 5*c* is a logic table showing signals resulting from the detection of horizontal and vertical strokes of the intelligence characters of FIGS. 5*a* and *b* as read in FIGS. 1 and 2;

FIG. 6 is a block diagram of a detector for the logic signals related to the vertical strokes of each intelligence character read in FIGS. 1 and 2; and FIGS. 7*a*, *b* and *c* are block diagrams of discrete detectors for the logic signals related to horizontal strokes of each intelligence character read in FIGS. 1 and 2.

FIG. 1 shows a document 11 containing a plurality of discrete intelligence characters 12 and movable in a straight line in a predetermined direction from left to right, for example, in a first horizontal plane as indicated by arrow 13 at a constant speed on a conventional endless belt, not shown, which is driven by a suitable source of power, not shown. Each of the characters is formed of a dark or black section surrounded by a white section. Light source 14 illuminates the document in proximity of each character in turn; and the reflected light is focused via lens 15 onto a solar battery cell detector 16 having a number of discrete cells and a function that are subsequently mentioned. The solar cell detector produces a plurality of discrete electric signals in response to a plurality of white and black sections of each character as later explained. An amplifier 17 comprising a plurality of discrete amplifiers amplifies the produced discrete electric signals in such manner as to correct the waveform thereof as pointed out below. The amplified signals applied to a logic AND-OR position corrector 18 are subjected to the correction of position therein as later explained. The amplified and position-corrected signals are then stored in shift register 19 from which the stored signals are supplied to vertical stroke detector 20 and horizontal stroke detector 21 as subsequently explained. The outputs of the horizontal and vertical stroke detectors are applied to a recognition circuit 22 for re-establishment. A timing pulse generator 23 provides timing pulses for controlling the operations of the several components in FIG. 1 as subsequently explained.

FIG. 2 embodies detector 16 comprising 32 solar battery cells, for example, including cells 16–1, 16–2, . . . 16–32, each of which generates an electric signal depending upon dark and white meshes in each of a plurality of vertical mesh strokes into which each character is divided as presently pointed out. These cells are arranged in spaced relation in a straight line in a direction transverse to the predetermined directional movement of the belt carrying the document. For the purpose of this explanation, each character is divided into 16 meshes of uniform dimensions in the direction of length as shown in FIG. 3*b* and each 16 vertical meshes forms one of the 10 vertical mesh strokes 1 . . . 10 as illustrated in FIG. 3*a*. These 16 vertical meshes serve to sense variations in the upper and lower halves of each of the scanned characters in turn. The outputs of the respective 32 solar cells of solar cell detector 16 are connected to the inputs of 32 individual amplifiers 17–1, 17–2, . . . 17–32 whose outputs are supplied to discrete AND gates 50–1, 50–2, . . . 50–32, respectively, of AND gate 50 in such manner that the output of amplifier 17–1 is connected to one input of AND gate 50–1, the output of amplifier 17–2 to the input of AND gate 50–2, and so on until the output of amplifier 17–32 is connected to the input of AND gate 50–32. Second inputs of AND gates 50–1, 50–2, . . . 50–32 are successively supplied via leads 301, 302, . . . 332, respectively, from outputs 1′, 2′, . . . 32′ of a first counter 63 which is stepped in repetitive cycles of a 1′ . . . 32′ count by shift pulses generated in a frequency controlled oscillator 62 in FIG. 2.

The 16–1 . . . 16–32 solar cells are positioned opposite the respective 16 meshes of each vertical mesh stroke of the vetrical stroke group 1 through 10 as shown in FIGS. 3*a* and *b*. Therefore, for example, the solar cells and the meshes of each vertical mesh stroke of the vertical mesh strokes 1 through 10 are so mutually disposed that solar cell 16–6 is positioned, for example, in front of mesh 1 of each vertical mesh stroke and solar cell 16–21 is positioned in front of mesh 16 of each vertical mesh stroke whereby each of solar cells 16–6 . . . 16–21 is positioned in front of one mesh of each vertical stroke as illustrated in FIG. 3*a*. Thus, each character of the document is scanned approximately 10 times from its uppermost mesh to its lowermost mesh of each vertical mesh stroke as the character is moved past the solar cells 16–6 . . . 16–21.

Each of solar cells 16–6 . . . 16–21 produces an electric signal depending upon the disposition of a dark mesh opposite thereto in each of the vertical mesh strokes 1 through 10 as the sheet carrying the characters is moved in a straight line in a vibrationless manner. As a consequence, amplifiers 17–6 . . . 17–21 connected to solar cells 16–6 . . . 16–21, respectively, amplify the electric signals received therefrom. When, however, the belt is subjected to vibration, it may move in the first plane in an up direction, for example, transverse to its normal straight line direction, i.e., in the transverse direction in which the solar cells are disposed, to displace the lowermost mesh of one vertical mesh stroke above solar cells 16–21 in FIG. 3*a* and the uppermost mesh of the latter vertical mesh stroke above solar cell 16–6. Thus, solar cell 16–21 and one or more solar cells thereabove do not detect electric signals from one or more of the lowermost dark meshes of the one vertical mesh stroke while solar cell 16–5 and one or more solar cells thereabove are caused to detect electric signal from one or more of the dark meshes disposed opposite thereto as the vertical mesh stroke is displaced in the up-transverse direction.

The opposite effect takes place when the belt is moved in a down-transverse direction so that one or more meshes of the lowermost meshes of the one vertical mesh stroke is moved below solar cell 16–21 while one or more meshes of the uppermost meshes of the one vertical mesh stroke is moved below solar cell 16–6. Assuming for the moment that no solar cells are disposed above solar cell 16–6 or below solar cell 16–21 in FIG. 3*a* while the belt is subject to vibration, this would result in a partially scanned character for at least the one vertical stroke. However, due to the solar cells 16–1 . . . 16–5 disposed above solar cell 16–6 and solar cells 16–22 . . . 16–32 disposed below solar cell 16–21, all 16 meshes of the displaced one vertical mesh stroke are scanned but the electric signals derived from the latter displaced meshes produce a deformed waveform which is restored to a normal waveform in the following manner.

As the outputs of solar cells 16–1 . . . 16–32 are connected to the inputs of amplifiers 17–1 . . . 17–32, this ensures that any adjacent 16 solar cells disposed in front of any adjacent 16 meshes of each vertical mesh stroke during vibrationless and vibrating states of the belt carrying the characters being scanned at the moment supply electric signals to the respective amplifiers, depending upon the number of dark meshes in the vertical mesh stroke. It is thus apparent that when the belt is vibrationless, 16 solar cells 16–6 . . . 16–21 detect the 16 meshes of each vertical mesh stroke to provide the detected signals in a normal waveform; and when the belt is subject to vibration, either solar cells 16–5 . . . 16–20 or 16–7 . . . 16–22 detect the 16 meshes of each vertical stroke to provide the detected signals in the deformed waveform to either amplifiers 17–5 . . . 17–20 or 17–7 . . . 17–22, respectively, for correction as previously mentioned. Now, the amplified 16 electric signals in the respective amplifiers are scanned in turn via appropriate AND gates 50–6 . . . 50–21 for a normal signal waveform and either AND gates 50–5 . . . 50–20 or 50–7 . . . 50–22 for a deformed waveform from the lowest numbered AND gate to the highest numbered AND gate for each of the vertical strokes 1 through 10 in FIG. 3*a*, and thereafter are applied in succession to OR gate 51 whose output supplies logic 1-signals in a waveform representing a normal waveform. Thus, the deformed waveform is now corrected in such sense that the 16 amplified signals derived from the 16 meshes in each vertical stroke appear to be derived from intelligence characters carried on a vibrationless belt.

The successive logic 1-signals in the output of OR gate 51 are shifted to component registers 52–1, 52–3 and 52–3 of a first shift register 52 under control of the shifting pulses supplied by oscillator 62 at which time AND gate 53 is opened to transmit a logic 1-signal to set the T-side of bistable device 57, and the now set bistable device 57 supplies a logic 1-signal on lead 333 to AND gate 60 and on lead **333*a* to AND gate 65 whereby these two AND gates are opened for a purpose and in a manner which are presently explained. As signals are now stored in component registers 52–2 and 52–3 and as bistable device 59 is now reset to its C-side as hereinafter explained to supply a logic 1-signal via lead 336 to AND gate 54, the latter gate is opened to provide a logic 1-signal which sets the T-side of bistable device 58. This device transmits an output 1-signal on lead 334 to advance a second 32″ count pulse counter 66 to its 32″ count state. Monostable device 64 activated by pulses of oscillator 62 supplies a pulse signal which together with the 1-signal on lead 333*a* opens AND gate 65, and which at the same time activates monostable device 67. Open AND gate 65 supplies an output 1-signal to adjust counter 66 to its 1″ count state whereupon counter 66 transmits the 1″ count pulse to set bistable device 59 to its T-side. This device then supplies an output 1-signal via lead 335 to AND gate 61 which is also receiving an output pulse from monostable device 67. These two signals open AND gate 61 which thereupon supplies an output pulse to AND gate 60 receiving at this time a 1-signal via lead 333. These two signals open AND gate 60 which then transmits a logic 1-signal as a shift pulse for second and third shift registers 55 and 56**.

Now, the signal stored in component register 52–3 is shifted into shift register 55. In a similar manner, logic 1-signals in the output of OR gate 51 are shifted into component registers 52–1, 52–2 and 52–3 and from the latter register into shift register 55. When counter 66 reaches its 17″ count state, a signal therefrom resets bistable device 59 to its C-side to provide a logic 0-signal on lead 335 to close AND gate 61 and at the same time to provide a 1-signal on lead 336 to AND gate 54 as above mentioned. Thus, the meshes of vertical mesh stroke 1 in FIG. 3*a* are scanned via appropriate solar cells, amplifiers, AND gates and OR gate 51 to provide a number of bits in shift register 55 in correspondence with the number of dark meshes in the latter vertical mesh stroke 1 in the 1″ . . . 16″ count cycle of counter 66. In a similar manner, the meshes of vertical mesh stroke 2 in FIG. 3*a* are scanned to provide a number of bits in shift register 55 in correspondence with the number of dark meshes in the latter vertical mesh stroke while at the same time the bits initially stored in shift register 55 are shifed to shift register 56.

FIGS. 3*a* and *b* provide additional information regarding the foregoing explanation of the operation of FIG. 2 for the purpose of reading a preselected intelligence character comprising numeral 1, for example, in accordance with the latter figure. FIG. 3*b* shows the numeral 1 divided into 16 meshes disposed in a vertical or lengthwise direction and 10 meshes disposed in a horizontal or width direction. For the purpose of this explanation, each column of 16 meshes disposed in a vertical direction is herein referred to as a vertical mesh stroke and each row of the 10 meshes disposed in the horizontal direction as a horizontal mesh stroke. It is understood that all intelligence characters read herein in accordance with the present invention are similarly divided, and that while numerals are used as intelligence characters for the purpose of the explanation of the invention, the latter comprehends letters of the alphabet as well as other characters utilized in intelligence communication. FIG. 3*b* illustrates the mesh columns of the preselected numeral 1 divided further into vertical mesh strokes 1 through 10 extending from right to left and the rows of horizontal strokes divided into at least 3 horizontal strokes, viz, upper, middle and lower for purposes that are subsequently explained.

The reading of the numeral 1 in FIGS. 3*a* and *b* is effected in a manner which is now explained. It is assumed that meshes 70 through 78 (except 73) represent dark meshes which cause appropriate solar cells in FIG. 2 to produce discrete electric signals. It is understood in actual practice that more or less dark meshes are provided depending upon the configuration of the character being read at a given time. It is assumed that logic 1-signals representing meshes 70, 71 and 72 are now stored in component registers 52–3, 52–2 and 52–1, respectively. This opens AND gate 53 which produces a 1-signal to set the T-side of bistable device 57 to activate the latter device to supply an output 1-signal on leads 333 and **333*a* for opening AND gates 60 and 65 and to open AND gate 54 to advance counter 66 to the 32″ state as above explained. Since AND gate 65 is now open, the output signal of monostable device 64 passes therethrough to step the second counter 66 from its 1″ count through its 16″ count while AND gate 61 is open due to the 1-signal on lead 335 and the successive output pulses from monostable device 67**.

The successive output pulses of monostable devices 67 are transmitted through open AND gates 61 and 60 to shift the signals due to meshes 70 through 73 in vertical mesh stroke 1 in FIG. 3*a* into a corresponding number of of component registers in shift register 55 comprising 16 component registers for storing up to 16 bits. It is noted that the bits due to meshes 70 through 73 are stored in shift register 55 in a descending numerical order, i.e., the bits are shifted in the direction from the highest numbered component register toward the lowest numbered component register. This completes the scanning of vertical mesh stroke 1 in FIG. 3*a* for the purpose of this explanation.

The next step involves the scanning of vertical mesh stroke 2 in FIG. 3*a* in which bits representing a start from mesh 74 are net shifted into shift register 55 while the bits stored therein for vertical mesh stroke are shifted into shift register 56 in the manner explained above. For this purpose, it is understood that the shift pulses in the output of AND gate 60 in FIG. 2 serves to shift the shift registers 55 and 56 at the same time, as both latter shift registers are connected in tandem as shown in FIGS. 2 and 4. Shift register 56 also has 16 component registers, equal to the number of meshes in each of vertical mesh strokes 1 through 10 in FIG. 3*a*, for receiving 16 bits from shift register 55. This completes the scanning of vertical mesh stroke 2.[1] Next, in the scanning of vertical mesh stroke 5 in FIG. 3*a*, it is noted that when the bits representing meshes 75 and 76 are shifted into component registers 52–3 and 52–2, respectively, and AND gate 54 is open to supply a 1-signal to step counter 66 to its "1" count, then open AND gate 61 allows a series of pulses from the output of monostable device 67 to pass therethrough and through open AND gate 60 to shift the bits representing meshes 75, 76 and 77 into shift register 55. When the scannings of the remaining vertical mesh strokes 6 through 10 are similarly carried out, the detected waveform of preselected numeral 1 upon the shifting of the bit representing mesh 78 in vertical mesh stroke 10 in FIG. 3*a* into shift register 55 and as represented by the bits stored in both shift registers 55 and 56 is that shown in FIG. 3*b*, assuming the number of component registers in shift registers 55 and 56 is equal to the whole number of sections into which the numeral 1 is divided as indicated by meshes 75 through 78 in FIG. 3*a*. Mesh 73 also serves to mark the end of each of the vertical scanning strokes 2 through 10 for the assumed character "1."

[1] Next, the scanning of vertical mesh strokes 3 and 4 by the shift register 55 are initiated from the same initial scanning position as the scannings of 1 and 2 because AND gate 65 is kept opened.

It is recalled from the previous explanation that upon the reset of bistable device 59 to its C-side in FIG. 2, a 1-signal was provided on lead 336 connected to AND gate 54. This is to ensure that the shift pulse provided on lead 334 for adjusting counter 66 to its 32″ count is not made available in advance in each scanning cycle of the latter counter so long as, for example, in FIG. 3*a* a signal representing a dark mesh of numeral 1 is not provided earlier than mesh 70 in the vertical mesh stroke. A signal pulse applied to terminal 501 in FIG. 2 to indicate a break between successive scanned characters is generated in a manner explained hereinafter to reset the C-side of bistable device 57 for each character thereby providing a logic 0-signal on output leads 333 and 333*a* to close AND gates 60 and 65 in FIG. 2 indicating the completion of the scanning of each successive character. The signal pulse applied to terminal 501 as just mentioned is generated in a conventional 12″ state counter, not shown but included in the 32″ state counter 66, each time the 12″ state counter reaches the 12″ state count upon receipt thereat of the pulse produced at the 32″ state count of counter 66 in FIG. 2.

FIG. 4 shows shift registers 55 and 56 connected in tandem for storing bits corresponding to meshes 70 through 78 shown in FIG. 3*a* to represent the numeral 1 for the purpose of this explanation.

FIGS. 5*a* and *b* illustrate numerals 1 through 5 that are readable in accordance with the specific embodiment of the present invention. FIG. 5*b* shows the states of the respective numerals as stored by bits in shift registers 55 and 56. It is noted that only numeral 1 is stored in the deformed waveform while the remaining numerals are stored in normal waveforms. This deformed waveform may be corrected in a manner hereinafter explained.

Now, it is recalled that bits representing numeral 1 are stored in the tandem connected shift registers 55 and 56 in FIGS. 2 and 4. It is noted that FIG. 6 includes the inputs of OR gate 101 connected to component registers 55–1 and 56–1 of shift registers 55 and 56, respectively, in FIGS. 2 and 4; the inputs of OR gate 102 to component registers 55–2 and 56–2; the inputs of OR gates 103 . . . 107 to component registers 55–3 . . . 7 and 56–3 . . . 7, although not shown; and the input of OR gate 108 to component registers 55–8 and 56–8; and the outputs of the respective OR gates 101 . . . 108 to the input of AND gate 117. FIG. 6 also shows the inputs of OR gate 109 connected to component registers 55–9 and 56–9, the inputs of OR gate 110 connected to component registers 55–10 and 56–10, the inputs of OR gates 111 . . . 115 to component registers 55–11 . . . 15 and 56–11 . . . 15, not shown, and the input of OR gate 116 connected to component registers 55–16 and 56–16; and the outputs of the respective OR gates 109 . . . 116 connected to the input of AND gate 118. Thus, the output of AND gate 117 is the product of each OR gate output of two component registers on the left and right-hand sides in the upper halves of shift registers 55 and 56 in FIG. 4 and the output of AND gate 118 is the product of the outputs of each OR gate output of two component registers on the left and right-hand sides of the lower halves of shift registers 55 and 56 in FIG. 4. Therefore, the output signal of AND gate 117 signifies that the bits representing the upper halves UV of the vertical strokes 1 through 10 of numeral 1 in FIG. 3*a* are stored in component registers 55–1 . . . 8 of both shift registers 55 and 56 while the output of AND gate 118 signifies the bits representing the lower halves LV of the vertical strokes 1 through 10 of numeral 1 in FIG. 3*a* are stored in component registers 55–9 . . . 16 and 56–9 . . . 16 of both shift registers 55 and 56.

The output signals of AND gates 117 and 118 are supplied to AND gates 19 and 120, respectively, which are both connected to terminal 502 receiving a second signal corresponding to the 17″ count of pulse counter 66 in FIG. 2 for a purpose that is hereinafter mentioned. The outputs of AND gates 119 and 120 are supplied to the T-sides of bistable devices 121 and 122, respectively. When a 1-signal is available in the output of either one or both of AND gates 119 and 120, as well as at terminal 502, one or both of bistable devices 121 and 122 is set at its T-side to provide a 1-signal to either one or both of shift registers 123 and 124. Both latter registers are simultaneously shifted in response to a 1-signal received from the output of AND gate 127 in the following manner. At the beginning of the scanning or reading of a character in FIG. 2, say numeral 1 as hereinbefore assumed as an example, a 1-signal is made available at terminal 504 in FIG. 6 from the 12″ state count of the 12″ state counter connected to the 32″ state count in counter 66 in FIG. 2. This 1-signal passes through OR gate 125 to the T-side of bistable device 126 which is thereby set to supply a first 1-signal to the input of AND gate 127 which receives a second 1-signal via terminal 503 from the 18″ state of counter 66. These two 1-signals open AND gate 127 which produces the 1-signals to simultaneously step shift registers 123 and 124 as just mentioned.

Next, if a character is sensed in FIG. 2 as hereinbefore assumed, the 17” state of counter 66 in FIG. 2 supplies a first 1-signal from its 502” terminal to terminal 502 in FIG. 6 to reset bistable device 126 to its C-side to close AND gate 127 by removing the 1-signal therefrom and at the same time to supply a 1-signal to reset bistable devices 121 and 122 to their C-sides whereas the next succeeding 17″ state provides a second 1-signal to set the T-side of bistable device 126 to provide a 1-signal to open gate 127 again. In other words, after bistable device 126 was first set to its T-side to open AND gate 127, this device is then reset to its C-side to close AND gate 127 whereby the latter AND gate is opened each time the scanning operation has been performed twice, i.e., AND gate 127 is opened once for the effective scanning of vertical strokes 1 and 2 in FIG. 3*a*, once for the effective scanning of vertical strokes 3 and 4, once for the effective scanning of vertical strokes 5 and 6, once for the effective scanning of vertical strokes 7 and 8, and once for the effective scanning of vertical strokes 9 and 10. Thus, AND gate 127 pjroduces a 1-signal in its output each time a character has been scanned twice in the sense just mentioned. This means that for the reading of the preselected character comprising numeral 1 in FIG. 3*a* as previously assumed, 5 signal pulses may be stored in each of fourth and fifth shift registers 123 and 124, respectively, in FIG. 6 in the respects of the signals store in one or more of the 5 component registers in shift register 123 serving to present the upper halves UV of vertical strokes 1 and 2 in FIG. 3*a* and of the signals stored in one or more of the5 components registered in shaft register 124 serving to represent the lower halves LV of the last-mentioned vertical strokes for the purpose of interpreting the table shown in FIG. 5*c*. It is noted that bistable devices 121 and 122 are reset to their C-sides each time bistable device 126 produces a 1-signal at the C-side thereof.

FIGS. 7*a, b* and *c* constitutes detectors for the upper, middle and lower horizontal strokes UH, MH and LH, respectively, included, but not shown, in the numeral 1 being read at the moment in FIG. 3*a* in the following manner. FIG. 7a constituting detector 200 for the upper horizontal stroke UH comprises OR gate 150 having its inputs supplied with the outputs of component registers 55–1, 55–2 and 55–3 of shift register 55 in FIGS. 2 and 4 for the purpose of detecting the presence or absence of a horizontal stroke in the upper part of the numeral 1 being read. The output of OR gate 150 is simultaneously supplied to the inputs of AND gates 151, 152 and 153 which also receive at their inputs the 1‴ count, 2‴ count and 3‴ count pulse signals, respectively, provided by a third counter 165 which is driven via terminal 505 receiving a 17″ count pulse signal from terminal 505″ of counter 66 in FIG. 2. The AND gates 151, 152 and 153 also receive simultaneously the pulse signal available at terminal 505. The 1‴ count, 2‴ count and 3‴ count pulses of counter 165 are supplied via leads 340, 341 and 342 to AND gates 151, 152 and 153, respectively.

When a 1-signal is provided at the output of OR gate 150 and 18″ count pulse of counter 66 is available at the same time at terminal 505 to activate AND gates 151, 152 and 153 counter and 165 to supply the 1‴ state, 2‴ state and 3‴ state pulse signals in succession to the latter AND gates, these AND gates are successively opened to trigger monostable devices 154, 155 and 156 in sequence for supplying three successive output signals. The effective overall width of the latter three output pulses in time is predetermined to be slightly longer than the time duration of the pulse signal available at terminal 505. The three successive output pulse signals provided by monostable devices 154, 155 and 156 activate OR gate 157 to produce an output signal continuously so long as a logic 1-signal is stored in at least one of component registers 55–1, 55–2 and 55–3 in FIGS. 2 and 4 at the end of each scanning cycle as controlled by counter 66 in FIG. 2. This permits the detection as to whether the upper horizontal stroke UH of the numeral 1 is continuous or not. It is therefore obvious that when all of component registers 55–1, 55–2 and 55–3 do not store a logic 1-signal, then OR gate 157 does not produce an output signal.

The output of OR gate 157 is simiultaneously supplied to monostable device 158 and AND gate 159. Terminal 506 in FIG. 7 is connected to terminal 506″ in FIG. 2 to receive the 18″ state pulse signal therefrom so that the latter signal together with the output of OR gate 157 only when the latter is producing an output signal, opens AND gate 159 which provides an output pulse to activate counter 160 for detecting the length of the upper horizontal stroke UH. This is further discussed hereinafter in connection with the table shown in FIG. 5*c*.

When counter 160 registers a 5 count, an output pulse signal sets the T-side of bistable device 161 to supply a 1-signal to one input of AND gate 163 which is also receiving as a second input a 1-signal from the C-side of bistable device 162 in the reset state so as to open the last-mentionad gate to provide an output signal at terminal 510; and when counter 160 registers an 8 count, an output pulse signal sets the T-side of bistable device 162 to supply an output signal at terminal 511 and at the same time to terminate the 1-signal being supplied to AND gate 163 for causing the closing thereof. It is seen in FIG. 7*a* that a pulse signal received at the 12″ state count of the 12″ state counter from terminal 507′ connected to the 32″ state of counter 66 in FIG. 2, before the start of a counting cycle thereof, in order to reset bistable devices 161 and 162 to their C-sides. The C-side of bistable device 161 provides no output signal whereas the output 1-signal from the C-side of reset bistable device 162 and the output 1-signal from the T-side of bistable device 161 serve to open AND gate 163 for the purpose just mentioned.

When counter 160 registers a count less than the 5 count, no signal is provided at either one of output terminals 510 and 511; when counter 160 registers a count in the range of a 5 count through a 7 count, a signal is provided at output terminal 510 in the manner explained above; and when counter 160 counts not less than the aforenoted 8 count, a signal is provided at output terminal 511 in the manner previously described. A count by counter 160 of less than a 7 count is hereinafter referred to as a short horizontal upper stroke SHU and a count not lower than an 8 count by the same counter is hereinafter referred to as a long horzontal upper stroke LHU for the purpose of interpreting the table illustrated in FIG. 5*c*. Monostable device 158 is also arranged to provide an output signal pulse upon the deactivation of OR gate 157 to reset counter 160 to the 0 count state. Thus, the short horizontal stroke signifies the width of the upper vertical stroke is short while the long horizontal indicates the width of the upper vertical stroke is long.

FIG. 7*b* constituting detector 201 for the middle horizontal stroke MH of the numeral 1 being read at the moment in FIG. 2 has its input connected to the output of OR gate 170 which includes its inputs 55–7, 55–8 and 55–9 of OR gate 170 connected to component registers 7, 8 and 9, respectively, of shift register 55 in FIGS. 2 and 4. The operation of OR gate 170 in conjunction with detector 201 is identical with that of OR gate 150 in conjunction with detector 200 as just described. Thus, when the counter, not shown, in detector 201 registers a count less than a 5 count, no signal is provided at either one of output terminals 512 and 513 of detector 201; when the counter in detector 201 registers a count in the range of a 5 count through 7 count, a signal is provided at output terminal 512 to represent a short horizontal middle stroke SHM for the purpose of the table in FIG. 5*c*; and when the counter in detector 201 registers a count not less than an 8 count, a signal is provided at output terminal 513 to represent a long horizontal middle stroke LHM for the purpose of the table in FIG. 5*c*. Thus, the short middle horizontal stroke signifies the width of the upper and lower vertical strokes is short at their adjoining ends while the long middle horizontal stroke indicates the width of the latter strokes at their adjoining ends is long.

FIG. 7*c* constituting detector 202 for the lower horizontal stroke LH of the numeral 1 being read at the moment in FIG. 2 has its input connected to the output of OR gate 171 which includes its inputs 55–14, 55–15 and 55–16 connected to component registers 14, 15 and 16, respectively, of shift register 55 in FIGS. 2 and 4. The operation of OR gate 171 in conjunction with detector 202 is identical with that of OR gate 150 in conjunction with detector 200 as just described. Hence, when the counter, not shown, in detector 202 registers a count less than a 5 count, no signal is provided at either one of output terminals 514 and 515 of detector 202; when the counter in detector 202 registers a count in the range of a 5 count through a 7 count, a signal is provided at output terminal 514 to represent a short horizontal lower stroke SHL for the purpose of the table in FIG. 5*c*; and when the counter in detector 202 registers a count not less than an 8 count, a signal is provided at output terminal 515 to represent a long horizontal lower stroke LHL for the purpose of the table in FIG. 5*c*. The short horizontal stroke signifies the width of the lower vertical stroke is short while the long horizontal stroke indicates the width of the lower vertical stroke is long.

It is thus seen that FIGS. 6 and 7*a*, *b* and *c* serve to detect the horizontal and vertical strokes of the numeral 1 being read in FIG. 2 for the purpose of this description in the mutual relation therebetween as illustrated in FIGS. 5*b* and *c*. As recognition circuit 22 in FIG. 1 is understood to include a plurality of AND gates, not shown, and as the signals derived represent the vertical and horizontal strokes of the numeral 1 being read as above explained and applied to such AND gates these enable the circuit 22 to recognize the numeral 1 in the sense shown in FIG. 5*b* in accordance with a procedure well known in the art as hereinafter explained upon receipt of a 10 to 1 count down pulse produced in a conventional count-down circuit, not shown but included in timing pulse generator 23, when the 1 through 10 vertical scanning strokes shown in FIG. 3*a* are completed. It is noted in FIG. 5*b* that numeral 1 is recognized in a deformed state unless correction for such deformation is built into shift registers 123 and 124 in FIG. 6. Such correction is expeditiously built into shift registers 123 and 124 in such manner that, for example, a signal stored as bit UV–1 in FIG. 7*c* without the correction is shifted to be stored actually a bit LV–1 at the time when mesh 75 is sensed in FIG. 3*a*. In this way, bits representing meshes 70, 71, 72, 73 and 74 in FIG. 3*a* are actually stored in registers 123 and 124 so as to enable the recognition circuit to recognize the numeral 1 as illustrated in FIGS. 3*a* and 5*a*. Shift registers 123 and 124 may be further modified to include built-in corrections for other characters that may have representative bits stored therein in such manner that the other characters would be recognized in a deformed state without the benefit of the built-in corrections. A pulse signifying the end of the scanning of each character is applied to terminal 501 in FIG. 2 as previously mentioned.

The table in FIG. 5*c* shows the 5 bits representing the upper halves UV and the 5 bits representing the lower halves LV of the numerals 1 . . . 5, for example, read one at time in FIG. 2 and stored in succession in shift registers 123 and 124, respectively, in FIG. 6 for derivation one at a time from shift registers 123 and 124 in turn as the latter registers are scanned twice as previously mentioned; the 3 bits representing the upper, middle and lower strokes U, M and L, respectively, of long horizontal strokes LH available at output terminals 511, 513 and 515 in FIGS. 7*a*, *b* and *c*, respectively for the same numerals 1 . . . 5 read in FIG. 2 for derivation from each of the latter terminals in turn as counter 160 attains the 8''' state count as above pointed out; and the 3 bits representing the upper, middle and lower strokes U, M and L, respectively, of short horizontal strokes SH available at output terminals 510, 512 and 514 in FIGS. 7*a*, *b* and *c*, respectively, for the same numerals 1 . . . 5 read in FIG. 2 for derivation from the latter terminals one at a time as counter 160 attains a 5'' to 7'' state count as hereinbefore stated. These bits are readily recognizable by recognition circuit 22 to constitute the numerals 1 . . . 5 one at a time as hereinbefore mentioned. It is obvious that additional numerals together with letters of the alphabet and other communication characters are read similarly to the numeral 1.

It is understood that each of terminals 1 through 5, not shown, of each of shift registers 123 and 124 supply bits representing the upper and lower vertical strokes UV1 through UV5 and LV1 through LV5, respectively, to recognition circuit 22 via suitable electric leads indicated in FIG. 1 wherein vertical stroke detector 20 represents shift registers 123 and 124. It is also understood that terminals 511, 513 and 515 supplying the bits representing the long horizontal strokes LHU, LHM and LHL, respectively, and terminals 510, 512 and 514 supplying the bits representing the short horizontal strokes SHU, SHM and SHL, respectively, are connected to recognition circuit 22 via appropriate electric leads indicated in FIG. 1 in which horizontal stroke detector 21 includes terminals 510 through 515. The AND gates included in recognition circuit 22 process the respective bits derived from the vertical and horizontal detectors 20 and 21, respectively, to recognize each character in accordance with well-known logic equations. For example, recognition circuit 22 recognizes the scanned numerical character "1" from the following equation:

$$1 = UV1 \cdot UV3 \cdot LV3 \cdot SHU \cdot SHM \cdot SHL \cdot \overline{UV5} \cdot \overline{LV5} \quad (1)$$

whose values are shown in FIG. 5*c*. By the use of similar equations, recognition circuit 22 recognizes the numerical characters 2 through 5 in FIG. 5*c* as scanned.

It is understood that while detector 16 shown in FIGS. 1 and 2 as comprising solar battery cells for the purpose of this description, such detector may also comprise phototransistors, photoresistors which are photoconductive cells, and the like.

It is further understood that the invention herein is described in specific respects for the purpose of this description. It is also understood that such respects are merely illustrative of the application of the invention. Numerous other arrangements may be devised by those skilled in the art without departing from the spirit and scope of the invention.

What is claimed is:

1. Apparatus for optically reading intelligence characters subject to undesired intermittent displacement from a normal moving direction during reading, comprising:

means containing a plurality of said characters and moving in a straight line in a first predetermined direction in a first plane at a preselected constant speed, each of said characters formed as a dark section surrounded by a white section;

means comprising a plurality of discrete solar battery cells arranged in spaced relation in a straight line over a distance exceeding the vertical length of the longest of said characters to extend in a direction transverse to said predetermined moving direction of said character moving means in a second plane spaced from said first plane in parallel relation therewith;

said preselected character means and solar cell arrangement serving to divide the vertical length of each of said characters into a predetermined number of dark and white meshes having uniform dimensions and arranged in contiguous columns, each of said meshes of said predetermined number of meshes in each of said columns thereof initially disposed opposite to one of a predetermined number of said solar cells, and said contiguous columns of meshes of each of said characters divided into a preselected number of vertical mesh strokes having equal spacing therebetween;

a source of light for illuminating each of said characters in proximity of said plurality of solar cells;

lens means for focusing light reflected from each of said characters in turn initially onto said predetermined number of solar cells which are activated by such reflected light to detect a predetermined number of discrete electric signals due to white and dark meshes during each of said vertical mesh strokes of said preselected number of vertical strokes as each of said characters in turn is moved past said lens means and solar cells for reading at a given time;

each of said predetermined number of solar cells disposed opposite to one of said predetermined numbei of meshes during each vertical mesh stroke thereoi serving to develop an electric signal for one of said dark meshes in each of said last-mentioned strokes as said character means is moved in a vibrationless manner, at least one solar cell at one end of said predetermined number of solar cells failing to develop an electric signal and at the same time at least one other solar cell positioned adjacent to an opposite end and outside of said last-mentioned predetermined number of solar cells serving to develop an electric signal as said moving means is subject to vibration displacing at least one of said vertical strokes of at least one of said characters in a direction transverse to said character normal moving direction;

a frequency controlled oscillator supplying alternating current of predetermined frequency.

first counting means activated by said alternating current to provide repetitive cycles of first counting pulses, each counting cycle containing pulses in a number equal to the number of solar cells in said plurality thereof;

a plurality of amplifiers for amplifying the electric signals detected by said solar cell means, each amplifier connected to one of said solar cells, a predetermined number of said amplifiers connected to said predetermined number of solar cells and receiving developed electric signals therefrom in a normal waveform as said character means is moved in said vibrationless manner, one of said predetermined amplifiers connected to said last-mentioned one solar cell failing to amplify an electric signal and one other of said plurality of amplifiers connected to said last-mentioned one other solar cell amplifying the electric signal received from said last-mentioned solar cell, said predetermined amplifiers minus said last-mentioned one amplifier and plus said last-mentioned one other amplifier receiving the developed electric signals in a deformed waveform.

logic AND means activated by each cycle of said first counting pulses scanning said plurality of amplifiers for selecting the amplified electric signals in normal and deformed waveforms therefrom;

logic OR means connected to said logic AND means for receiving the amplified electric signals in said normal and deformed waveforms therefrom to provide output signals having the amplified deformed signals restored to said normal signal waveform;

a first shift register having at least three component registers and activated by said oscillator current to transfer said OR means output 1-signals into said last-mentioned component registers;

second and third shift registers connected in tandem, each of said last-mentioned registers having a number of component registers equal to said predetermined number of meshes in each of said vertical mesh strokes;

means controlled by said oscillator current for producing first shifting pulses in synchronism with said first counting pulses;

means for providing repetitive cycles of second counting pulses;

first logic means activated by a preselected number of said second counting pulses as controlled by said oscillator current and signals stored in said first shift component registers for controlling said first shifting pulses to shift the signals from said last-mentioned component registers into register components of said second and third shift registers;

second logic means activated by preselected second counting pulses for utilizing the signals stored in said second and third shift registers to provide output signals representing predetermined lengths of the upper and lower halves of each of said characters in turn and predetermined lengths of preselected horizontal widths of each of said upper and lower halves of each of said characters in turn;

and means connected to said second logic means for recognizing the output signals thereof to re-establish each of said characters.

2. The apparatus according to claim 1 in which said second logic means includes third logic means activated by said preselected second counting pulses and utilizing said signals stored in corresponding one halves of said second and third shift registers for providing one group of said second logic means output signals to represent the length of one of said upper and lower halves of each of said characters in turn in correspondence with said signals stored in said one halves of said second and third shift registers.

3. The apparatus according to claim 2 in which said third logic means utilizes said signals stored in upper halves of said second and third shift registers for providing said one group of said second logic means output signals to represent the length of said upper half of each of said characters in turn.

4. The apparatus according to claim 2 in which said third logic means utilizes said signals stored in upper halves of said second and third shift registers for providing said one group of said second logic output signals to represent the length of said lower half of each of said characters in turn.

5. The apparatus according to claim 1 in which said second logic means includes third logic means activated by said preselected second counting pulses and utilizing said signals stored in upper halves of said second and third shift registers for providing a first group of said second logic means output signals to represent the length of said upper half of each of said characters in turn, and fourth logic means activated by said preselected second counting pulses and utilizing said signals stored in lower halves of said second and third shift registers for providing a second group of said second logic means output signals to represent the length of said lower half of each of said characters in turn.

6. The apparatus according to claim 1 in which said second logic means includes third logic means activated by said preselected second counting pulses and utilizing a preselected number of groups of said signals stored in one of said second and third shift registers for providing one group of said second logic means output signals to represent predetermined lengths of preselected horizontal sections of each of said upper and lower halves of each of said characters in turn.

7. The apparatus according to claim 6 in which one signal of said one group of second logic means output signals represents a predetermined short length of a preselected upper horizontal section of said upper half of each of said characters in turn.

8. The apparatus according to claim 6 in which one signal of said one group of second logic means output signals represents a predetermined long length of a preselected upper horizontal section of said upper half of each of said characters in turn.

9. The apparatus according to claim 6 in which one signal of said one group of second logic means output signals represents a predetermined short length of a preselected middle horizontal section of said upper and lower halves as combined for each of said characters in turn.

10. The apparatus according to claim 6 in which one signal of said one group of second logic means output signals represents a predetermined long length of a preselected middle horizontal section of said upper and lower halves as combined for each of said characters in turn.

11. The apparatus according to claim 6 in which one signal of said one group of second logic outpu signals represents a predetermined short length of a preselected lower horizontal section of said lower half of each of said characters in turn.

12. The apparatus according to claim 6 in which one signal of said one group of second logic output signals represents a predetermined long length of a preselected lower horizontal section of said lower half of each of said characters in turn.

13. The apparatus according to claim 1 in which said second logic means includes third logic means activated by said preselected second counting pulses and a first preselected group of said signals stored in one of said second and third registers for providing a first one of said second logic means output signals to represent one of short and long predetermined lengths at a preselected upper horizontal section of an upper half of each of said characters in turn;

fourth logic means activated by said preselected second counting pulses and a second preselected group of said signals stored in said one of said second and third shift registers for providng a second one of said second logic means output signals to represent one of short and long predetermined lengths at a preselected middle horizontal section of said upper and lower halves as combined for each of said characters in turn; and fifth logic means activated by said preselected second counting pulses and a third preselected group of said signals stored in said one of said second and third shift registers for providing a third one of said second logic means output signals to represent one of short and long predetermined lengths at a preselected lower horizontal section of a lower half of each of said characters in turn.

14. Aparatus for optically reading intelligence characters subject to undesired intermittent displacement from a normal moving direction during reading, comprising:

means containing a plurality of said characters and moving in a straight line in a first predetermined direction in a first plane at a preselected constant speed, each of said characters formed as a dark section surrounded by a white section;

means comprising a plurality of discrete solar battery cells arranged in spaced relation in a straight line over a distance exceeding the vertical length of the longest of said characters to extend in a direction transverse to said predetermined moving direction of said character moving means in a plane spaced from said first plane in parallel relation therewith;

said preselected character means and solar cell disposition serving to divide the vertical length of each of said characters into a predetermined number of dark and white meshes having uniform dimensions and arranged in contiguous columns, each of said meshes of said predetermined number of meshes in each of said columns thereof initially disposed opposite to one of a predetermined number of said solar cells, and contiguous columns of meshes of each of said characters divided into a preselected number of vertical mesh strokes having equal spacings therebetween;

a source of light for illuminating each of said characters in proximity of said solar cells;

lens means for focusing light reflected from each of said characters in turn initially onto said predetermined number of solar cells which are activated by such reflected light to detect a predetermined num- of discrete electric signals due to white and dark meshes during each of said vertical mesh strokes of said preselected number of vertical mesh strokes as each of said characters in turn is moved past said lens means and solar cells for reading at a given time;

each of said predetermined number of solar cells disposed opposite to one of said predetermined number of meshes during each vertical mesh stroke thereof serving to develop an electric signal for one of said dark meshes in each of said last-mentioned strokes as said character means is moved in a vibrationless manner, at least one solar cell at one end of said predetermined number of solar cells failing to develop and electric signal while at the same time one other solar cell positioned adjacent to an opposite end and outside said last-mentioned predetermined number of solar cells serves to develop an electric signal as said moving means is subject to vibration displacing at least one of said vertical strokes of at least one of said characters in a direction transverse to said character normal moving direction;

a frequency controlled oscillator supplying alternating current of predetermined frequency;

first counting means activated by said alternating current to provide repetitive cycles of first counting pulses in number equal to the number of solar cells in said plurality thereof;

a plurality of amplifiers for amplifying the electric signals detected by said solar cell means, each amplifier connected to one of said solar cells, a predetermined number of said amplifiers connected to said predetermined number of solar cells and receiving developed signals therefrom in a normal waveform as said character means is moved in a vibrationless manner, one of said predetermined amplifiers connected to said last-mentioned one solar cell failing to amplify an electric signal and one other of said plurality of amplifiers connected to said last-mentioned one other solar cell amplifying the electric signal received from said last-mentioned solar cell, said predetermined amplifiers minus said last-mentioned one amplifier and plus said last-mentioned other amplifier receiving the developed electric signals in a deformed waveform;

logic AND means activated by each cycle of said first counting pulses scanning said plurality of amplifiers for selecting the amplified signals therefrom in normal and deformed waveforms;

logic OR means connected to said logic AND means for receiving the amplified electric signals in said normal and deformed waveforms therefrom to provide output 1-signals having the amplified deformed signals restored to said normal waveform;

a first shift register having at least three component registers and activated by said oscillator current to transfer said OR means output 1-signals into said last-mentioned component registers;

second and third shift registers connected in tandem, each of said last-mentioned registers having a number of component registers equal to said predetermined number of meshes in each of said vertical strokes thereof;

means controlled by said oscillator current for producing first shifting pulses in synchronism with said first counting pulses;

means for providing repetitive cycles of second counting pulses;

first logic means activated by a preselected number of said second counting pulses as controlled by said oscillator current and signals stored in said first shift component registers for controlling said first shifting pulses to shift the signals from said last-mentioned component registers into said second and third shift registers;

second logic means activated by preselected second counting pulses and utilizing signals stored in upper halves of said second and third shift registers for providing a first group of signals to represent the length of the upper half of each of said characters in turn;

third logic means activated by said preselected second counting pulses and utilizing signals stored in lower halves of said second and third shift registers for providing a second group of signals to represent the length of the lower half of each of said characters in turn;

fourth logic means activated by said preselected second counting pulses and utilizing a predetermined number of different groups of said signals stored in one of said second and third shift registers for providing a third group of signals to represent predetermined lengths of preselected horizontal sections of said upper and lower halves of each of said characters in turn;

and means for recognizing said first, second and third groups of signals to re-establish each of said characters in turn.

References Cited

UNITED STATES PATENTS

| | | | |
|---|---|---|---|
| 3,243,776 | 3/1966 | Abbott et al. | 340—146.3 |
| 3,305,835 | 2/1967 | Beltz | 340—146.3 |

THOMAS A. ROBINSON, Primary Examiner